F. GRAF.
EMERGENCY VEHICLE BRAKE.
APPLICATION FILED JULY 25, 1918.

1,303,553.

Patented May 13, 1919.
2 SHEETS—SHEET 1.

Inventor,
Frederick Graf
By Frederick V. Wutter
Attorney.

F. GRAF.
EMERGENCY VEHICLE BRAKE.
APPLICATION FILED JULY 25, 1918.
1,303,553.
Patented May 13, 1919.
2 SHEETS—SHEET 2.
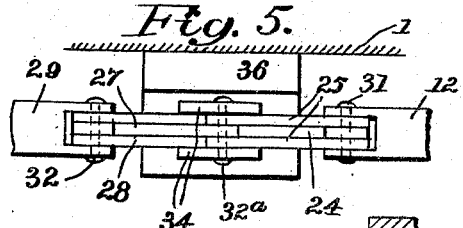
Fig. 5.
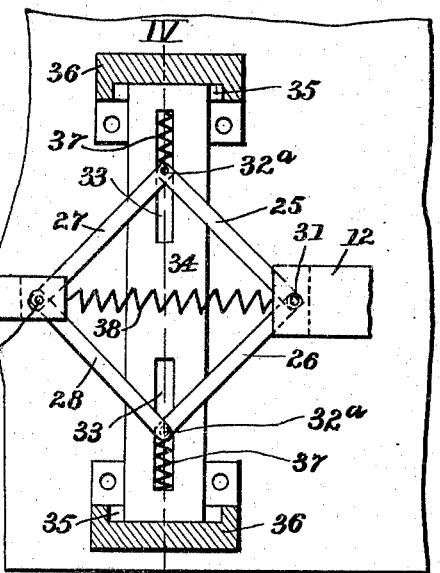
Fig. 3.
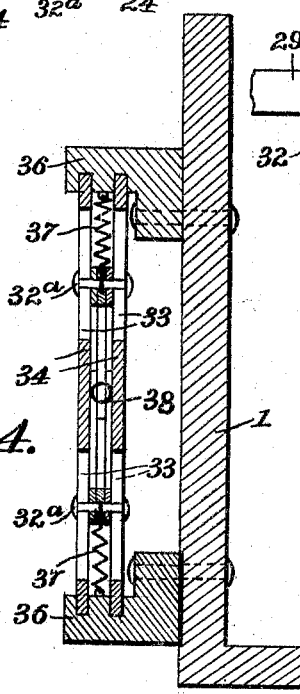
Fig. 4.
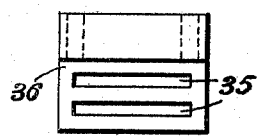
Fig. 6.
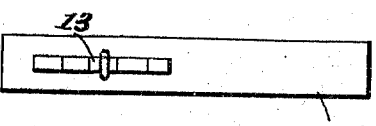
Fig. 8.
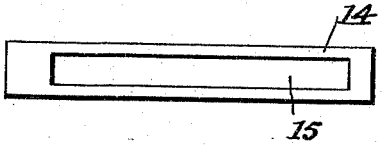
Fig. 9.
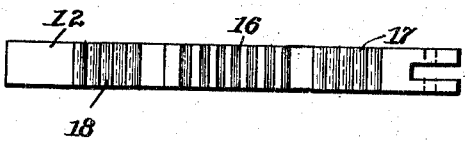
Fig. 10.
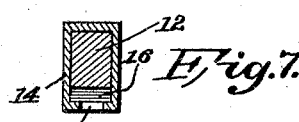
Fig. 7.
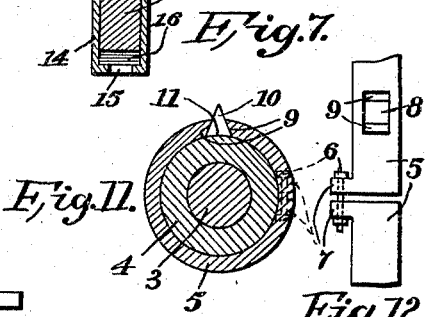
Fig. 11.
Fig. 12.
Inventor:
Frederick Graf
By Frederick V. Winters
Attorney.

UNITED STATES PATENT OFFICE.

FREDERICK GRAF, OF NEW YORK, N. Y.

EMERGENCY VEHICLE-BRAKE.

1,303,553.  Specification of Letters Patent.  Patented May 13, 1919.

Application filed July 25, 1918. Serial No. 246,623.

*To all whom it may concern:*

Be it known that I, FREDERICK GRAF, a citizen of the United States, residing at New York city, county and State of New York, have invented certain new and useful Improvements in Emergency Vehicle-Brakes, of which the following is a full, clear, and exact specification.

This invention relates to emergency brakes for vehicles, and has for its object to produce a brake of this kind which may be applied by the rotation of one of the vehicle wheels in either direction, that is, when the vehicle is moving backward as well as when it is moving forward.

The invention contemplates the use of a toothed rack bar connected to the brake rod and normally supported out of the path of a cog on one of the vehicle wheels, but which may be moved into engagement with said cog in an emergency, whereupon the rotation of said wheel and cog will apply the brake by moving the rack bar step by step as the cog engages the rack bar on each revolution of the wheel. Means are provided in the connection between the rack bar and brake rod for utilizing the movement of said rack bar in either direction, by the rotation of the wheel either forward or backward, to apply the brake, and means are also provided for retaining the rack bar against retrograde movement after each step in its advance in either direction by the cog on each revolution of the wheel.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 3 is an elevation of the pantograph device looking from the opposite direction from that shown in Fig. 1.

Fig. 4 is a section on the line IV—IV of Fig. 3.

Fig. 5 is a plan of the pantograph device with the upper guide for cross heads removed.

Fig. 6 is a detailed plan view of one of the guides.

Fig. 7 is a section on the line VII—VII of Fig. 1, showing the arrangement of the rack bar in its casing.

Fig. 8 is a plan view of said casing.

Fig. 9 is a bottom plan view thereof.

Fig. 10 is a bottom plan view of the rack bar,

Fig. 11 is a section through the hub of the wheel and cog attaching strap, and

Fig. 12 is a detailed fragmentary view of the cog attaching strap showing more clearly the opening therein in which the cog fits.

Figure 1:
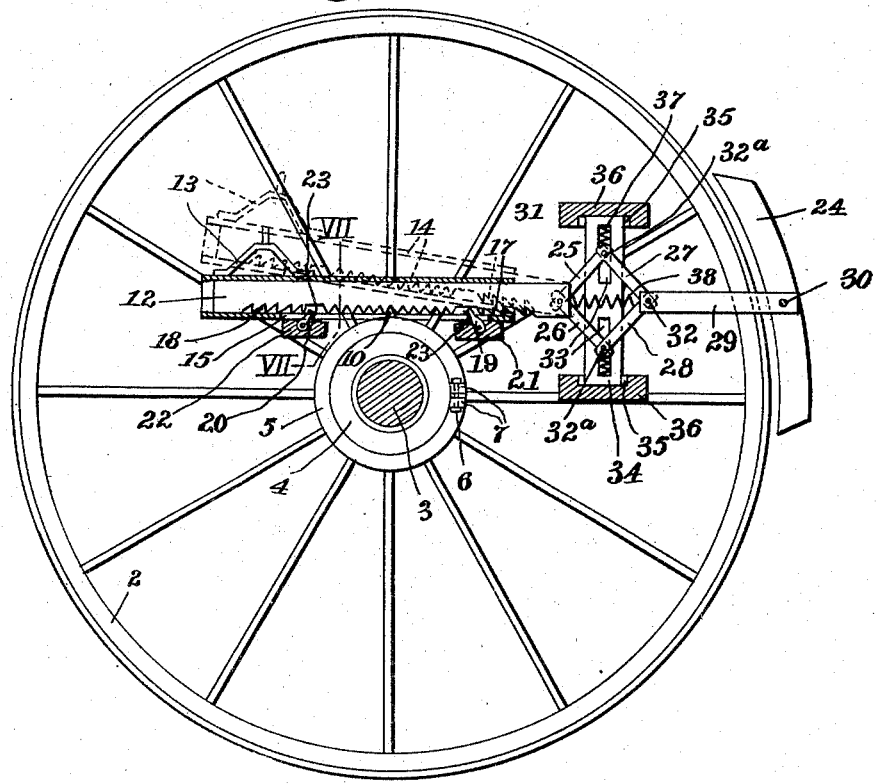
Figure 1 is a section on the line I—I of Fig. 2, showing the rack bar in engagement with the cog on the wheel, and its normal raised position in dotted lines.
Figure 2:
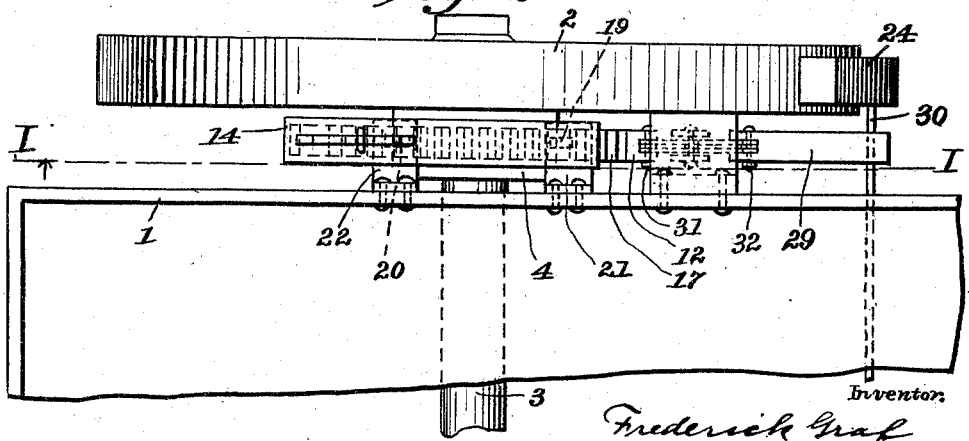
Fig. 2 is a plan view of the brake mechanism, showing its position relative to the side of the vehicle and the wheel carrying the cog.

In the drawings, 1 designates the vehicle body and 2 one of the road wheels which is mounted on one end of an axle 3. Around the hub 4 of this wheel a band or strap 5 is secured by means of a bolt 6 passed through laterally offset ears 7 at its ends, as best shown in Figs. 1, 11 and 12. This band or strap 5 has an opening or slot 8 through it, said slot having oppositely beveled walls 9 to fit and hold the V-shaped cog 10 which has a concave inner face 11 to fit against the hub 4, and a pointed outwardly projecting body portion constituting the cog proper.

Above the cog 10 a rack bar 12 may be normally supported out of engagement therewith, as shown in dotted lines in Fig. 1, by any suitable means, such as a chain (not shown) attached to a bracket 13 on the upper face of a box-like casing 14 in which the rack bar is housed. Said casing 14 is open at both ends and has a slot 15 in its bottom face through which the cog has access to a series of V-shaped teeth 16 on the middle portion of the bottom face of said rack bar 12, when the casing is lowered to the position shown in solid lines in Fig. 1 by any suitable mechanism (not shown) under control of the driver. The rack bar also has a series of ratchet teeth near each end of its bottom face. The ratchet teeth 17 near the right hand end of the rack bar face to the right, while the ratchet teeth 18 near the left hand end of said rack bar face to the left. Pawls 19 and 20, carried on brackets 21 and 22, respectively, suitably fastened to the side of the vehicle body 1, are adapted to engage the respective ratchet teeth 17 and 18 for retaining the rack bar against retrograde movement when propelled in one direction or the other by the cog 10, as will be readily understood. The pawls are yieldingly held in position to engage the ratchet teeth by springs 23, Fig. 1.

The rack bar 12 is connected to the brake shoe 24, which acts upon the rim of the wheel 2, through a pantograph device comprising four sets of links connected end to end in the form of a parallelogram, two of the links 25 and 26 being connected to the rack bar 12 and the other two links 27 and 28 being connected to the brake rod 29 which in turn is connected to the cross rod 30 on which the brake shoe 24 is mounted. It will be understood that the links are swiveled to the rack bar and brake bar by bolts or rivets 31 and 32. The links 25 and 27, and links 26 and 28 are also swiveled together by bolts or rivets 32ª which extend through vertical slots 33 in a pair of cross heads 34, one of which is arranged at each side of said links, as best shown in Figs. 4 and 5. The ends of the cross heads 34 are guided in grooves 35 in guide brackets 36 which are suitably fastened to the side of the vehicle body, said grooves permitting the cross heads to have a limited movement in a horizontal plane. Cushioning springs 37 are arranged between the bolts or rivets 32 and the upper end of the upper slot 33 and the lower end of the lower slot 33. A compensating spring 38 is arranged horizontally across the pantograph between the bolts or rivets 31 and 32.

In operation, when the rack bar 12 is lowered into the position shown in solid lines in Fig. 1, the cog 10 will engage one of the V-shaped teeth 16 on said rack bar on each revolution of the wheel 2. If the wheel is turning in a clockwise direction, this action of the cog will move the rack bar to the right step by step, and the pawl 20 will coöperate with the ratchet teeth 18 on the left hand end portion of the rack bar to retain said bar in its progressive stages of movement toward the right. This movement of the rack bar toward the right will cause the links of the pantograph device to become extended vertically and contracted horizontally, the springs 37 and 38 serving to cushion this action and the grooves 35 in the guides 36 permitting the cross heads to adjust themselves to this movement of the links. The result is that the brake rod 29 is moved to the left and the brake shoe brought into contact with the rim of the wheel 2, after which further revolutions of the wheel will only serve to more tightly clamp the brake shoe against said wheel. If the wheel is turning in an anti-clockwise direction, the cog will move the rack bar toward the left step by step and said rack bar will be retained in its progressive movement in this direction by the pawl 19 engaging the ratchet teeth 17 on the right hand end portion of said rack bar. This movement of the rack bar to the left will tend to straighten out or extend the links of the pantograph device horizontally while contracting them vertically, but the spring 38 prevents too great a movement of the links in this way and serves to draw the brake rod 29 to the left and again apply the brake shoe 24 to the rim of the wheel. In this operation the cross heads 34 are also free to move in the grooves 35 in the guides 36 to accommodate the movement of the pantograph links.

Having thus described my invention, what I claim as new and desire to secure by Letters Patent of the United States is:—

1. In a brake of the character described, the combination with a cog to be attached to turn with a vehicle wheel, of a rack bar to be arranged in the path of said cog, a brake shoe, and a set of pantograph links connecting said rack bar and brake shoe, whereby the brake will be applied when the wheel is turning in either direction.

2. In a brake of the character described, the combination with a cog to be attached to turn with a vehicle wheel, of a rack bar to be arranged in the path of said cog, a brake shoe, means of connection between said brake shoe and rack bar whereby the brake may be applied when the rack bar is moved in either direction, and means for retaining said rack bar in the progressive stages of its movement in either direction.

3. In a brake of the character described, the combination with a cog to be attached to turn with a vehicle wheel, of a rack bar to be arranged in the path of said cog, a brake shoe, means of connection between said brake shoe and rack bar whereby the brake may be applied when the rack bar is moved in either direction, the rack bar having oppositely facing ratchet teeth, and pawls to engage said ratchet teeth for retaining the rack bar in the progressive stages of its movement in either direction.

4. In a brake of the character described, the combination with a cog to turn with a vehicle wheel, of a rack bar having teeth to be engaged by said cog, a casing in which said rack bar is adapted to slide and which has a slot in its bottom to permit access by said cog to said teeth, said casing being movable to bring the teeth of the rack bar either into or out of engagement with the cog, and a brake shoe operatively connected to said rack bar.

5. In a brake of the character described, the combination with a vehicle wheel, of a strap to fit around the hub of said wheel, means for clamping said strap about said hub, said strap having an opening through it with oppositely beveled wall, a cog having converging sides to fit in said opening in the strap and be retained thereby to turn with the wheel, a rack bar to be engaged by said cog, and a brake shoe operatively connected to said rack bar.

6. In a brake of the character described, the combination with a strap to fit around the hub of a vehicle wheel, a cog secured to said hub by said strap, a rack bar to be engaged by said cog, and a brake shoe operatively connected to said rack bar.

7. In a brake of the character described, the combination with a strap to fit around the hub of a vehicle wheel, said strap having an opening therethrough with oppositely beveled walls, a cog having converging sides to fit said beveled walls of the opening in the strap and a concave base to fit against the hub of the wheel, whereby said cog is secured to turn with the hub by said strap, a rack bar to be engaged by said cog, and a brake shoe operatively connected to said rack bar.

8. In a brake of the character described, the combination with a cog to turn with a vehicle wheel, of a rack bar to be engaged by said cog, a brake shoe, a set of pantograph links connecting said rack bar and brake shoe, means for guiding the free pivots of said links, and a spring connecting the rack bar and brake shoe across said links, whereby the brake shoe may be applied by a movement of the rack bar in either direction.

9. In a brake of the character described, the combination with a cog to turn with a vehicle wheel, of a rack bar to be engaged by said cog, a brake shoe, a set of pantograph links having opposite link pivots connected respectively to the rack bar and to said brake shoe, cross heads having slots, the free pivots of said links extending into and guided by said slots, means to guide said cross heads, and a spring connecting the rack bar and brake shoe across said links, whereby the brake shoe may be applied by a movement of the rack bar in either direction.

10. In a brake of the character described, the combination with a cog to turn with a vehicle wheel, of a rack bar to be engaged by said cog, a brake shoe, a set of pantograph links having opposite link pivots connected respectively to the rack bar and to the brake shoe, cross heads having slots, the free pivots of the links extending into said slots, cushioning springs between the free pivots of the links in said slots and the outer ends of said slots, means to guide the cross heads, and a spring connecting the rack bar and brake shoe across said links, whereby the brake shoe may be applied by a movement of the rack bar in either direction.

11. In a brake of the character described, the combination with a cog to turn with a vehicle wheel, of a rack bar to be engaged by said cog, a brake shoe, a set of pantograph links having opposite pivots of its links connected respectively to the rack bar and to the brake shoe, cross heads arranged at both sides of the links and having slots into which the free pivots of the links extend, brackets having parallel grooves into which the ends of the cross heads fit and in which they are guided, and a spring connecting the rack bar and brake shoes across the links, whereby the brake shoe may be applied by a movement of the rack bar in either direction.

In testimony whereof I have signed my name to this specification.

FREDERICK GRAF.

Copies of this patent may be obtained for five cents each, by addressing the "Commissioner of Patents, Washington, D. C."